Sept. 16, 1969　　　　A. L. SHOOK　　　　3,466,785
TROTLINE DISPENSER
Filed July 14, 1967
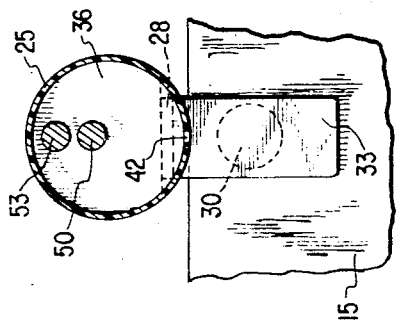
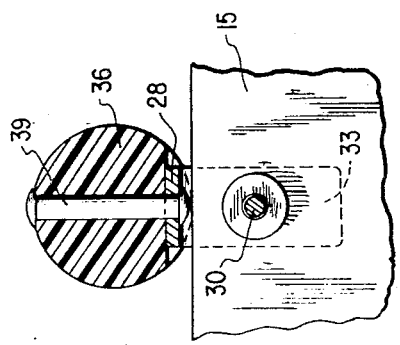
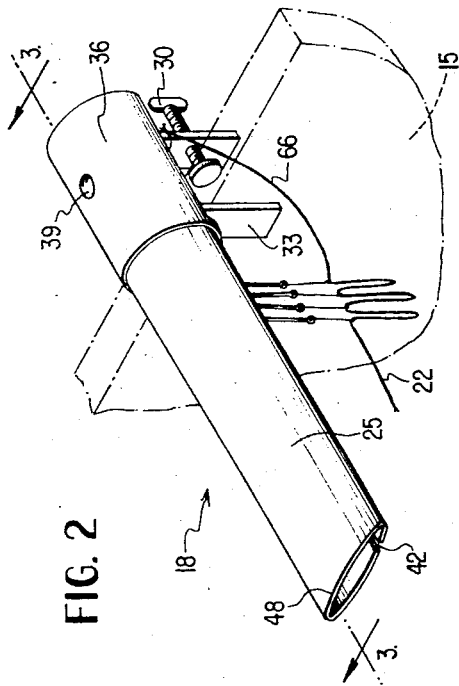
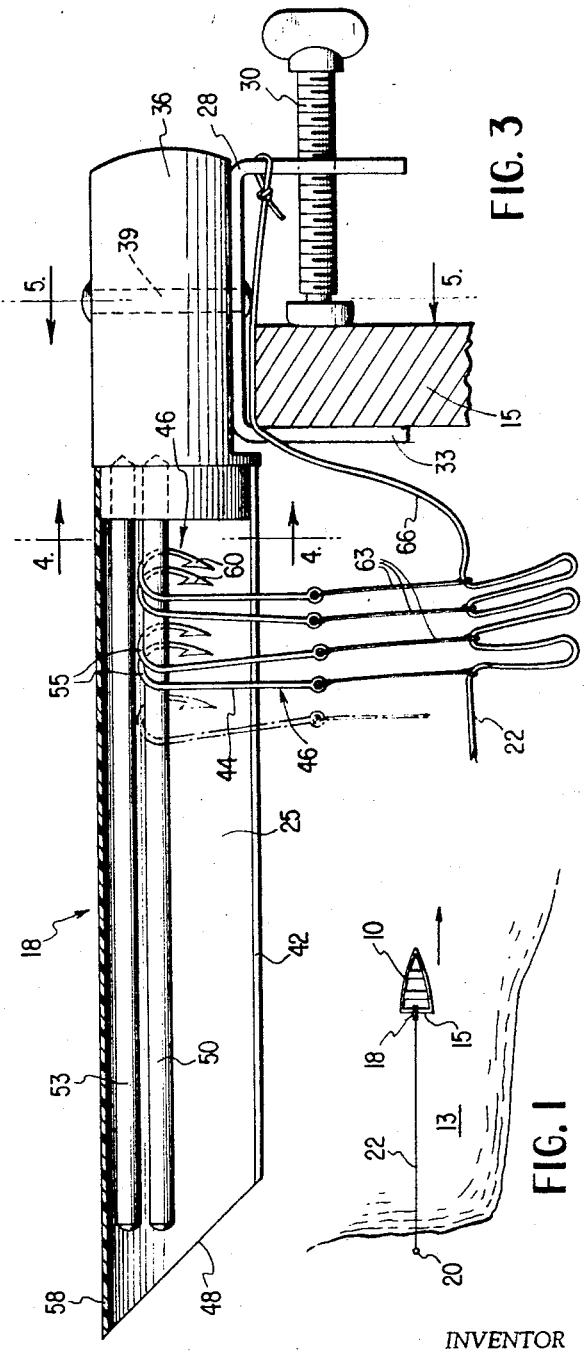
INVENTOR
ALVIN L. SHOOK
BY
ATTORNEY 3,466,785
TROTLINE DISPENSER
Alvin L. Shook, 301 S. Pearl,
Salem, Ill. 62881
Filed July 14, 1967, Ser. No. 653,516
Int. Cl. A01k 91/00
U.S. Cl. 43—27.4                        3 Claims

ABSTRACT OF THE DISCLOSURE

A trotline holder and dispenser composed of a body portion removably clamped to a support, such as the transom of a boat, for free movement about a vertical axis and having an end from which a pair of coextensive horizontal shafts project in vertical overlying relation with the lower shaft slidably supporting the bend portions of hooks on spaced stagings of the trotline and the upper shaft overlying the bend portions. A tubular cover coaxially encircles the shafts and extends from the body end wall and has a downwardly angled cut-off, open outer end providing a hood projecting axially beyond the outer ends of the shafts above the upper shaft and an unobstructed path below the shaft ends for the free falling off of the hooks from the outer end of the lower shaft.

DESCRIPTION

This invention is a novel dispensing mechanism for a trotline. Trotlines are used in many states by both commercial and sport fishermen to catch fish which are attracted by stationary bait, e.g., catfish, in relatively quiet water, with a minimum amount of attention. A trotline may consist of perhaps a hundred hooks suspended from a main line, which is placed across a stream, lake, bay, etc. The main line is held in place by stakes at the two sides of the body of water or to a stake at one side of the water and a boat in the water. The hooks are attached to the main line by staging lines which often allow the hooks to be suspended 18 inches or more below the water surface. The hooks are generally required by state fishing regulations to be no closer than three feet to each other.

As will be readily understood, the placing of a trotline, having hooks attached thereto, across a stream, will usually require untangling of the hooks and lines as the placement of the line proceeds, with considerable consumption of time and hazards to the fisherman from the sharp hooks which must be handled. As an alternative to this untangling procedure, the main line, without the staging and hooks, may sometimes be placed across the fishing ground and after being provided with suitable floats, the fisherman may proceed along the main line, fastening the hooks to the main line and baiting the hooks. Once the trotline is in place and baited it generally is checked for any catch about once every hour and a single trotline often can assure the fisherman looking for a more challenging catch, or a hunter, a ready supply of food fish during his camping period.

It will be readily understood that the setting up of a trotline in either of the conventional manners described is an overly time-consuming task and presents many hazards in the handling and tying of so many hooks to the main line or untangling of the hooks while in a boat. This invention provides means for setting up a trotline which substantially avoids exposure of the fingers to the trotline hooks and avoids the tying of hooks individually to the main line.

This invention provides a dispenser for a trotline made up of a main line having attached fishing hooks. Each hook has a shank portion, a bend portion and a barb. The dispenser provides a pair of substantially parallel shafts spaced apart from each other a distance approximately equal to the diameter of the wire from which the bend portion of the hook is made. Thus the hooks may be held at the bend portion, between the shafts in an orderly fashion and may be dispensed, one by one, from between the shafts. Other features of the invention provide for automatic dispensing of the trotline, once the trailing end of the main line is fastened to a fixed object, by mere motion of the boat away from the fixed object. Thus, the invention provides means to support the parallel shafts in a horizontal orientation on a boat; when so supported the parallel shafts are preferably vertically aligned with each other. It is preferred to have a lower cylindrical shaft upon which the bend portion of each hook rests. Thus the diameter of the lower shaft is less than the opening in the bend portion of the hook. Advantageously, the upper of the two shafts also is cylindrical to avoid any sharp edges which can damage the hooks in their rapid passage between the two shafts in being dispensed. The shafts are made of aluminum.

To secure maximum safety, the two parallel shafts are enclosed in a barrel of a size sufficient to enclose the barbs of the hooks, the barrel being provided with a slot through which the shank portions of the hooks may extend. This slot is at the bottom of the barrel, aligned with the shafts. Thus the dispenser may be loaded by placing the bend portion of the hooks, one by one, upon the lower shaft and pushing them by means of the shank portions of the hooks, which extend through the slot in the barrel, along the lower shaft.

The support for the shafts and barrel will include a plastic body which is essentially freely rotatable, in a horizontal plane, around an axis. The shafts, when force-fitted to this plastic body, will thus have a certain amount of "give" enabling easier loading and dispensing. This support body, in the operation of the dispenser, is on the leading end of the shafts and barrel.

At the trailing end, the barrel is open and this opening is larger than the cross-sectional area of the barrel. Such a configuration can be readily provided, for example, by cutting the trailing end of the barrel at an angle to the cylindrical axis of the barrel, e.g., at about 45° angle. The trailing ends of the shafts project partially into this opening. Thus, when the shafts are horizontally oriented the upper portion of the barrel opening provides a hood over the shaft ends, while providing an unobstructed path below the shafts for hooks falling from between said shafts into the water. When not in use, the open end of the barrel may be capped or plugged to keep the hooks inside the barrel.

The body which supports the shafts and barrel, as mentioned, is essentially freely rotatable in a horizontal plane. This freedom may be provided by attaching the body at its axis of rotation to a means which fastens the dispenser to the boat.

The invention will be better understood by reference to the accompanying drawings in which:

FIGURE 1 is an overhead view of a trotline being set up using the novel apparatus of this invention:

FIGURE 2 is a perspective view of the dispenser of this invention, as attached to the transom of a boat, after most of the hooks have been withdrawn from the dispenser;

FIGURE 3 is a view, mostly in cross-section, along the line 3—3 of FIGURE 2;

FIGURE 4 is a cross-sectional view along the line 4—4 of FIGURE 3; and

FIGURE 5 is a cross-sectional view along the line 5—5 of FIGURE 3.

In the drawing, FIGURE 1 shows a boat 10 on a body of water 13, the boat 10 having the transom 15 to which the dispenser of this invention, designated in general by the numeral 18 is fastened. FIGURE 1 also shows a stake 20 in the ground at the side of the body of water. To this stake the trailing end of main line 22 is fastened. It will be readily understood that a tree, rock or other fixed objects may be used instead of the stake 20 and that the dispenser 18 may be fastened to the gunwale or other part of the boat, generally in a position permitting the barrel 25 of the dispenser to be outboard of the boat 10.

The dispenser 18 is fastened to the boat, usually in a readily removable fashion by any convenient means, for example, the U-shaped bracket 28 and screw 30 which holds one leg 33 of the bracket 28 against the transom 15. To the top of bracket 28 is fastened the body 36 by means of the rivet 39. It will be noted that the body 36 is free to rotate clockwise or counterclockwise on the bracket 28, the rivet 39 forming an axle so that the barrel 25, fastened to the body 36, will automatically align itself, due to tension from the main line 22, in the direction of travel of the boat, during the setting up of the trotline, no matter where on the boat the bracket 28 is attached. As can be seen, the barrel 25 is a generally cylindrical tube having its leading end fastened to the body 36 in any convenient manner, for example, in the collar-like fashion shown. The barrel 25 is provided at its bottom with the elongated slot 42 through which the shanks 44 of hooks 46 project. The barrel 25 also is cut at its trailing end at an angle, say of about 45°, to provide the enlarged opening 48 for dispensing and reloading the hooks.

As can be seen, the barrel 25 encloses the two vertically aligned shafts 50 and 53 which are substantially parallel to each other and to the axis of the barrel 25. As can be seen, the bend portions 55 of hooks 46 are supported by the cylindrical shaft 50. Shaft 53 is placed above the shaft 50 by a distance approximately equal to the diameter of the wire from which the hooks 46 are made, usually about 1/16" apart. Preferably, the shafts 50 and 53 are made of aluminum and are fastened to body 36, by force fitting. Body 36 is of plastic, this arrangement allowing, as mentioned, for some "give" in the parallel relationship of shafts 50 and 53. It has been found that shaft 53 is also preferably cylindrical to allow rapid dispensing of the hooks 46 without damaging them.

It will be observed that shafts 50 and 53 also are coextensive, their trailing ends ending about midway in the opening 48. In this way the bends 55 may be rapidly released from between the shafts due to motion of the boat and the resulting tension of the main line 22, and the hooks 46 have an unobstructed downward path into the water. Also, the upper portion 58 of the trailing end of the barrel 25 provides a hood to protect the user of the device from contact with the barbs 60 of the hooks during dispensing of the trotline and during reloading of the hooks in the dispenser.

The shank 44 of each hook is attached by means of a staging 63 to the main line 22, which, as can be seen, is generally of much heavier gage than the staging line 63. The leading edge 66 of the main line 22 is generally attached to some part of the dispenser, for example, the bracket 28, during the dispensing operation.

The manner in which the device is used will be readily understood from the drawing and the above description. The dispenser is loaded with the desired number of hooks; for example, about 100, held between the parallel shafts. The barbs of the hooks may all face in the same direction but this is not an absolute requirement. The dispenser is fastened to a boat and the trailing edge of the main line is fastened to a fixed object on shore. Then the boat is propelled in the water away from the fixed object. This motion of the boat causes the barrel to be aligned with the direction of motion and the tension on the main line causes the hooks to be pulled out, one by one, from between the parallel shafts 50 and 53. Floats may be placed at desired intervals on the main line. After all the hooks, or a desired number of the hooks are dispensed, the leading end of the main line may be fastened into the position in which the trotline is to be left. For example, it may remain fastened to the boat and the boat anchored or the lending end may be fastened to a fixed object on the shore opposite the first fixed object. Alternatively, the leading end of the main line may be fastened to a float which can be anchored in place in the water. After the trotline is set up, the hooks are baited.

After use, the trotline may be readily packed by slipping the bends of the hooks, in order, between the shafts 50 and 53, sliding the shanks 44 of the hooks through the slot 42 and into the proximity of the body 36. After insertion of all the hooks, the trailing end of the barrel may be capped, and the stagings and main line hanging out through the slot 42 may be wrapped around the barrel 25 for storage.

It will be apparent that many of the specific configurations and materials described may be varied by those skilled in the art without departing from the spirit or scope of this invention.

I claim:

1. A holder and dispenser for a trotline having spaced stagings with each having a fish hook that is composed of a shank portion, a bend portion, and a barb, comprising: a body portion, means for removably mounting the body portion in a substantially horizontal position on a support, said body portion having an end wall, a pair of shafts secured to the end wall of the body portion and projecting horizontally therefrom in overlying parallelism, said shafts being substantially coextensive and including an upper and a lower substantially cylindrical shaft arranged substantially in the same vertical plane and spaced apart a vertical distance approximately equal to the thickness of the bend portions of the hooks which slidably fit on the upper surface of the lower shaft immediately under the lower surface of the upper shaft, said upper surface of the lower shaft being rounded in conformance with the inner curvature of the bend portions of the hooks, said lower shaft being of a cross-sectional dimension less than the cross-sectional distance between the legs of the bend portions of the hooks whereby the hooks slide on the lower shaft for withdrawal movement from between the shafts in an orderly fashion, and a tubular cover enclosing the shafts and having an inner end attached to the end wall of the body portion and having an outer open end terminating adjacent the substantially coterminus outer ends of the shafts, said cover being of an internal diameter sufficient to enclose the bend portions and barbs of the hooks in a spaced relation and having a bottom wall portion underlying the lower shaft, said bottom wall portion being formed with an elongated axial slot through which the shank portions of the hooks slidably extend in the dependency of the hooks from the lower shaft, said cover also having an upper wall portion, said upper wall portion of the cover projecting axially beyond the outer ends of the shafts to provide a hood overlying the shaft ends and the bottom wall portion of the cover terminating inwardly of the shaft ends to provide an obstructed path below the shaft ends for the free falling off of the hooks from the outer end of the lower shaft with the hood overlying the path of fall.

2. The invention of claim 1 wherein said means for mounting the body portion includes a clamp and a pivot element upstanding from the clamp and vertically oriented relative thereto and said body portion being freely mounted on the pivot element for free rotational movement with respect to the clamp.

3. The invention of claim 1 wherein said body portion is formed from plastic and said shafts are formed from aluminum, said end wall of the body portion having openings in which the inner ends of the shafts are force fitted so that there is a slight give in the parallel relationship of the shafts.

References Cited
UNITED STATES PATENTS

| | | | |
|---|---|---|---|
| 2,531,643 | 11/1950 | Pringle | 43—27.4 |
| 2,555,397 | 6/1951 | Coward | 43—27.4 X |
| 2,629,197 | 2/1953 | Duvall. | |
| 2,670,565 | 3/1954 | Platt. | |
| 3,047,978 | 8/1962 | Glover. | |

ALDRICH F. MEDBERY, Primary Examiner

DANIEL J. LEACH, Assistant Examiner

U.S. Cl. X.R.

43—54.5